(12) United States Patent
Engel

(10) Patent No.: US 7,280,337 B2
(45) Date of Patent: Oct. 9, 2007

(54) CIRCUIT BREAKER INCLUDING A NON-MECHANICAL, ELECTRONIC STATUS OR CONTROL CIRCUIT

(75) Inventor: Joseph C. Engel, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 142 days.

(21) Appl. No.: 10/912,376

(22) Filed: Aug. 5, 2004

(65) Prior Publication Data

US 2006/0028781 A1    Feb. 9, 2006

(51) Int. Cl.
*H01H 73/00* (2006.01)
(52) U.S. Cl. ..................................... 361/115
(58) Field of Classification Search ............... 361/115, 361/189, 190
See application file for complete search history.

(56) References Cited

U.S. PATENT DOCUMENTS

| | | | |
|---|---|---|---|
| 3,418,529 A * | 12/1968 | Attewell | 361/13 |
| 4,346,424 A | 8/1982 | Hansen | |
| 4,446,500 A | 5/1984 | Grenier et al. | |
| 4,556,882 A | 12/1985 | Brifman et al. | |
| 5,264,673 A | 11/1993 | Powell | |
| 5,301,083 A | 4/1994 | Grass et al. | |
| 5,373,411 A | 12/1994 | Grass et al. | |
| 5,552,755 A | 9/1996 | Fello et al. | |
| 6,104,265 A | 8/2000 | Maloney et al. | |
| 6,139,327 A | 10/2000 | Callahan et al. | |
| 6,259,339 B1 | 7/2001 | Simms et al. | |
| 6,388,858 B1 * | 5/2002 | Simms et al. | 361/115 |
| 6,469,600 B1 | 10/2002 | Seese et al. | |
| 6,507,255 B1 | 1/2003 | Ennis et al. | |
| 6,538,870 B2 | 3/2003 | Seese et al. | |
| 6,714,108 B1 | 3/2004 | Simms et al. | |
| 2002/0105771 A1 | 8/2002 | Simms et al. | |
| 2003/0193381 A1 | 10/2003 | Davidson et al. | |

* cited by examiner

*Primary Examiner*—Michael Sherry
*Assistant Examiner*—Lucy M. Thomas
(74) *Attorney, Agent, or Firm*—Martin J. Moran

(57) ABSTRACT

A controllable circuit breaker includes a housing, first and second inputs adapted to receive respective external close and open signals, a third input adapted to receive a control voltage, a set of main contacts, an operating mechanism for opening and closing those contacts; a set of secondary contacts connected in series with the main contacts, and a latching solenoid including a plunger latchable to a first position which closes the secondary contacts and to a second position which opens the secondary contacts. When separately energized, first and second coils operate the plunger to respective first and second positions. The first and second coils have a common node which is electrically connected to the third input. A non-mechanical, electronic control circuit within the housing is adapted to receive the external close and open signals and responsively energize the first and second coils, respectively, for a predetermined time.

11 Claims, 2 Drawing Sheets

CIRCUIT BREAKER INCLUDING A NON-MECHANICAL, ELECTRONIC STATUS OR CONTROL CIRCUIT

BACKGROUND OF THE INVENTION

1. Field of the Invention

This invention relates to circuit breakers for protecting electric power circuits. More particularly, it relates to circuit breakers including a set of secondary contacts, which are controllable through an operator, such as a magnetically latchable solenoid. The invention also relates to circuit breakers providing an external status signal.

2. Background Information

Circuit breakers used in residential and light commercial applications are commonly referred to as miniature circuit breakers because of their limited size. Such circuit breakers typically have a pair of separable contacts opened and closed by a spring biased operating mechanism. A thermal-magnetic trip device actuates the operating mechanism to open the separable contacts in response to persistent overcurrent conditions and to short circuits.

Usually, circuit breakers of this type for multiple circuits within a residence or commercial structure are mounted together within a load center which may be located in a basement or other remote location. In some applications, it has been found convenient to use the circuit breakers for other purposes than just protection, for instance, for load shedding. It is desirable to be able to perform this function remotely, and even automatically, such as under the control of a computer.

U.S. Pat. Nos. 5,301,083 and 5,373,411 describe a remotely operated circuit breaker, which introduces a second pair of contacts in series with main separable contacts. The main contacts still interrupt the overcurrent, while the secondary contacts perform the discretionary switching operations. The secondary contacts are controlled by a solenoid, which is spring biased to close the contacts.

The solenoid has two coils, an opening coil and a holding coil. Initially, both coils are energized to open the contacts. Power to the opening coil is then turned off, and only the holding coil remains energized. Thus, continuous power is required to keep the main contacts open. When power to the holding relay is terminated, the spring recloses the secondary contacts.

U.S. Pat. No. 6,259,339 discloses a remotely operated circuit breaker, which introduces secondary contacts in series with main separable contacts. The secondary contacts are controlled by a solenoid, which has two coils, a first (or close) coil and a second (or open) coil. The coils are concentrically wound on a steel core supported by a steel frame. A plunger moves rectilinearly within the coils. A permanent magnet is seated between the steel core and the steel frame. When the close coil is energized, a magnetic field is produced which counteracts the magnetic field produced by the permanent magnet. A spring then pushes the contact arm closed. The secondary contacts are maintained in the closed state by a spring. When it is desired to open the secondary contacts, the open coil is energized which lifts the plunger to open the secondary contacts. With the plunger in the full upward position, it contacts the steel core and is retained in this second position by the permanent magnet. Subsequently, when the close coil is energized, the magnetic field generated is stronger than the field of the permanent magnet and therefore overrides the latter and moves the plunger back to the closed position.

It is known to provide an auxiliary switch in a circuit breaker in order to provide normally open and/or closed contacts for external status information. See, for example, U.S. Pat. Nos. 6,104,265; 5,552,755; and 5,264,673.

A controller circuit breaker 2, as shown in FIG. 1, consists of a series combination of circuit breaker main contacts 4 and contactor secondary contacts 6. If the main and secondary contacts 4,6 are both closed, then a line voltage 8 is supplied from a line terminal 10 to a load terminal 12. For example, such devices may be used for automatic lighting control. The contactor 14 of the controller circuit breaker 2 is bi-stable and is magnetically held opened by a magnet (not shown) and is mechanically held closed via a spring (not shown). This bi-stable action is important, since the contactor 14 must not change state should control power be lost. The transition from opened-to-closed or closed-to-opened is achieved magnetically by selectively energizing solenoid windings 16 or 18, respectively. The amp-turns of the close winding 16 oppose the permanent magnetic holding flux of the magnet, thereby allowing the spring to force and maintain the contactor 14 in the closed position. When the open winding 18 is energized, the amp-turns are reversed, which supports the permanent magnet's flux. This causes a solenoid plunger 20 to move to a location that allows the magnet to hold such plunger in a contactor-opened position.

Two problems exist with this system. First, the coils for the windings 16,18 must be small, in order to fit into the housing 22 of the circuit breaker 2 and, thus, cannot continuously support control voltage 24, shown as +24 VDC. Because of this, a form 'C' auxiliary contact 26 is used that follows the contactor 14. During the transition, for example, from closed-to-opened (the contact 26 is shown closed in FIG. 1), the control voltage 24 applied to the winding 18 is removed. The mechanical design of this system is very difficult, since the control voltage to the winding 18 cannot be removed before the contactor 14 changes state or the transition may cease. Also, the control voltage 24 must be removed from the winding 18 after the transition has occurred or the corresponding coil may burn up. Hence, there is a relatively narrow tolerance band that must be maintained for such a design to work.

Second, the circuit breaker 2 requires the status of the load terminal 12 (i.e., whether there is a load voltage). For there to be load voltage, both the main and secondary contacts 4,6 must be closed. This logical function is provided by passing the control voltage 24 through the auxiliary contact 26, which follows the contactor 14, and through an auxiliary switch 28, which follows the main contacts 4. However, the addition of the circuit breaker auxiliary switch 28 adds mechanical complexity and cost.

Accordingly, there is room for improvement in circuit breakers requiring external control and/or providing external status information.

SUMMARY OF THE INVENTION

These needs and others are met by the present invention, which provides a non-mechanical, electronic control circuit within a circuit breaker housing. The non-mechanical, electronic control circuit is adapted to receive external close and open signals from first and second inputs and responsively energize first and second solenoid coils, respectively, for a predetermined time.

The invention may also provide a non-mechanical, electronic circuit within the circuit breaker housing. The non-mechanical, electronic circuit is adapted to provide a direct current status signal at an output when separable contacts are closed and a first or line terminal is energized with an alternating current voltage. The direct current status signal is representative of a second or load terminal being energized with the alternating current voltage.

In accordance with one aspect of the invention, a controllable circuit breaker comprises: a housing; a first input adapted to receive an external close signal; a second input adapted to receive an external open signal; a third input adapted to receive a control voltage; a set of main contacts; an operating mechanism for opening and closing the set of main contacts; a set of secondary contacts connected in series with the set of main contacts; a latching solenoid including a plunger latchable to a first position which closes the set of secondary contacts and to a second position which opens the set of secondary contacts, a first coil which when energized operates the plunger to the first position and a second coil which when energized operates the plunger to the second position, the first and second coils having a common node which is electrically connected to the third input; and a non-mechanical, electronic control circuit within the housing, the non-mechanical, electronic control circuit adapted to receive the external close and open signals from the first and second inputs and responsively energize the first and second coils, respectively, from the third input for a predetermined time.

The third input may be adapted to receive as the control voltage a direct current control voltage.

The non-mechanical, electronic control circuit may comprise, for each of the first and second coils, a first resistor, a capacitor electrically connected in series with the first resistor, a zener diode electrically connected in series with the first resistor and the capacitor, a second resistor electrically connected in parallel with the series combination of the first resistor, the capacitor and the zener diode, a third resistor electrically connected in parallel with the zener diode, a diode electrically connected in parallel with the first resistor, and a transistor adapted to switch current from one of the first and second coils to one of the first and second inputs, respectively, the transistor having an input electrically connected to the third resistor and the zener diode, the second resistor electrically connected between the third input and a corresponding one of the first and second inputs, the transistor being adapted to energize a corresponding one of the first and second coils for the predetermined time responsive to voltage across the zener diode resulting from current flowing through the series combination of the first resistor, the capacitor and the zener diode when a corresponding one of the external close and open signals is received.

The first resistor and the capacitor may substantially determine the predetermined time.

The third input may be adapted to receive as the control voltage a direct current control voltage. The set of main contacts may be adapted to input an alternating current voltage. The set of secondary contacts may be adapted to output the alternating current voltage. The non-mechanical, electronic control circuit may comprise an output and a status circuit, the status circuit may be adapted to provide a direct current status signal at the output when (i) the set of main contacts are closed and input the alternating current voltage, and when (ii) the set of secondary contacts are closed and output the alternating current voltage, the direct current status signal being representative of the set of secondary contacts outputting the alternating current voltage.

As another aspect of the invention, a circuit breaker comprises: a housing; an input adapted to receive a direct current control voltage; a first terminal adapted to input an alternating current voltage; a second terminal; separable contacts electrically connected between the first and second terminals; an operating mechanism for opening and closing the separable contacts; an output; and a non-mechanical, electronic circuit within the housing, the non-mechanical, electronic circuit adapted to provide a direct current status signal at the output when the separable contacts are closed and the first terminal is energized with the alternating current voltage, the direct current status signal being representative of the second terminal being energized with the alternating current voltage.

The non-mechanical, electronic circuit may comprise a first resistor, a zener diode electrically connected in series with the first resistor between the input and the second terminal, a diode electrically connected to the first resistor and the zener diode, a capacitor electrically connected in parallel with the series combination of the zener diode and the diode, a second resistor including a first node electrically connected to the input and a second node, a transistor adapted to switch a voltage from the second node of the second resistor to the output, the transistor including an input electrically connected to the capacitor and the diode, in order that the alternating current voltage at the second terminal provides the direct current status signal at the output.

The alternating current voltage may include a negative half cycle. The current may flow from the input through the zener diode and the first resistor to the second terminal. A voltage across the series combination of the zener diode and the diode may activate the input of the transistor.

The zener diode may have a first voltage. The diode may have a second voltage. The transistor may have a third voltage from the input thereof to the second node of the second resistor. The second resistor may have a resistance. The direct current status signal may include a current, which is limited by (i) the first voltage less the second and third voltages, divided by (ii) the resistance.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a remotely operated circuit breaker, although the invention is applicable to a wide range of controllable circuit breakers and/or circuit breakers including status outputs. An example of a remotely controllable circuit breaker is disclosed in U.S. Pat. No. 6,259,339, which is incorporated by reference herein.

Figure 2:
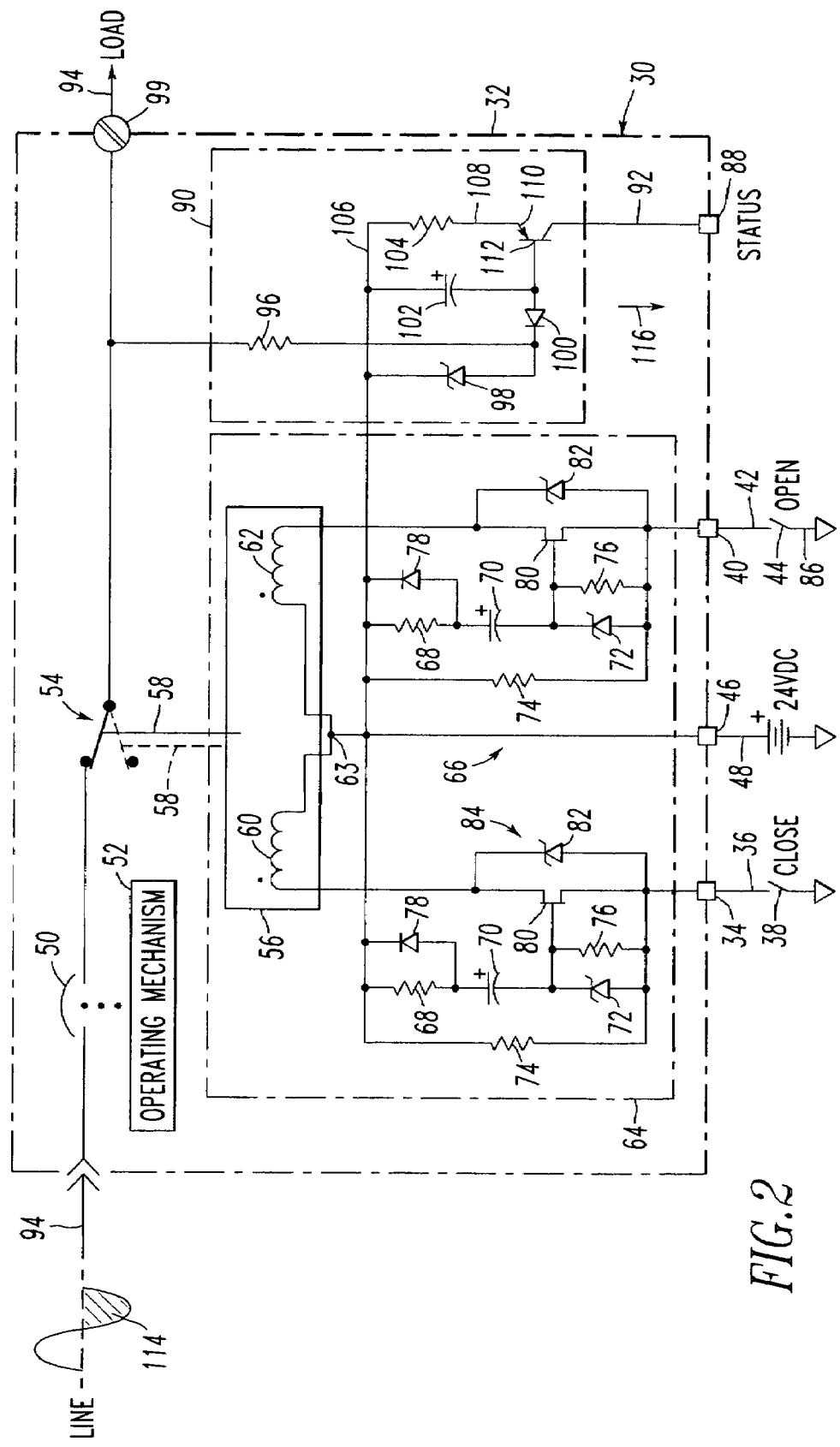
FIG. 2 is a block diagram of a controllable circuit breaker in accordance with the present invention.

Referring to FIG. 2, a controllable circuit breaker 30 includes a housing 32, a first input 34 adapted to receive an external close signal 36 (e.g., from normally open contact 38), a second input 40 adapted to receive an external open signal 42 (e.g., from normally open contact 44), and a third input 46 adapted to receive a control voltage, such as direct current (DC) voltage 48.

As is conventional, the circuit breaker 30 further includes a set of main contacts 50, an operating mechanism 52 for opening and closing the main contacts 50, a set of secondary contacts 54 electrically connected in series with the main contacts 50, and a latching solenoid 56 including a plunger 58 latchable to a first position (as shown in FIG. 2) which closes the secondary contacts 54 and to a second position (shown in phantom line drawing) which opens the secondary contacts 54. The solenoid 56 includes a first coil 60 which when energized operates the plunger 58 to the first, closed position and a second coil 62 which when energized operates the plunger 58 to the second, open position. The coils 60,62 have a common node 63 which is electrically connected to the third input 46.

In accordance with the invention, a non-mechanical, electronic control circuit 64 is within the circuit breaker housing 32. The control circuit 64 is adapted to receive the external close and open signals 36,42 from the first and second inputs 34,40 and responsively energize the first and second coils 60,62, respectively, from the third input 46 for a predetermined time.

As shown with the sub-circuit 66, the control circuit 64 includes, for the second coil 62, a first resistor 68, a capacitor 70 electrically connected in series with the first resistor 68, a zener diode 72 electrically connected in series with the first resistor 68 and the capacitor 70, and a second resistor 74 electrically connected in parallel with the series combination of the first resistor 68, the capacitor 70 and the zener diode 72. A third resistor 76 is electrically connected in parallel with the zener diode 72. A diode 78 is electrically connected in parallel with the first resistor 68. An FET 80 is adapted to switch current from the second coil 62 to the second input 40. The FET 80 has a gate input electrically connected to the third resistor 76 and the zener diode 72. The second resistor 74 is electrically connected between the third input 46 and the second input 40. The FET 80 is adapted to energize the second coil 62 for a predetermined time (e.g., as set by the resistor 68 and the capacitor 70) responsive to voltage across the zener diode 72 resulting from current flowing through the series combination of the first resistor 68, the capacitor 70 and the zener diode 72 when the external open signal 42 is received (e.g., contact 44 is closed). A second zener diode 82 is electrically connected in parallel with the FET 80 between the second coil 62 and the second input 40.

Except for the first input 34 and the first coil 60, the close sub-circuit 84 is the same as the open sub-circuit 66.

For open/close operation, as was discussed above, the two coils 60,62 have the common node 63 that is electrically connected to the third input 46 for receiving the external control voltage 48. In accordance with the invention, the coils 60,62 are de-energized via electronics rather than mechanically. For the opening process, the set of secondary contacts 54 is initially closed, as shown. When the normally open contact 44 initially closes and electrically connects the open signal 42 to ground 86, the FET 80 is momentarily turned on via FET gate voltage developed across the zener diode 72 by current flowing through the series combination of resistor 68 and capacitor 70. The duration of this current is determined primarily by the RC time constant of the resistor 68 and capacitor 70. For example, this can be set to about two line cycles (e.g., about 33 ms at 60 Hz), which is long enough for the latching solenoid 56 to change state, and which is short enough such that the coil 62 is not damaged. After that predetermined time, the FET 80 will remain off even if the external close contact 44 remains closed. Later, when that contact 44 is opened, the capacitor 70 discharges through the diode 78, the resistor 74 and the zener diode 72. This discharge time may be suitably relatively small, in order to permit suitably rapid open-close cycling. The zener diode 82 is used to limit the voltage transient across the FET 80 when it turns off.

Although not required, the circuit breaker 30 and/or the non-mechanical, electronic control circuit 64 may include an output 88 and a non-mechanical, electronic status circuit 90. The status circuit 90 is adapted to provide a DC status signal 92 at the output 88 when (i) the set of main contacts 50 are closed and input an alternating current (AC) voltage 94, and when (ii) the set of secondary contacts 54 are closed and output the AC voltage 94. Here, the DC status signal 92 is representative of the set of secondary contacts 54 outputting the AC voltage 94.

The status circuit 90 includes a first resistor 96, a zener diode 98 electrically connected in series with the first resistor 96 between the third input 46 and a load terminal 99, a diode 100 electrically connected to the first resistor 96 and the zener diode 98, and a capacitor 102 electrically connected in parallel with the series combination of the zener diode 98 and the diode 100. A second resistor 104 includes a first node 106 electrically connected to the third input 46 and a second node 108. A PNP transistor 110 is adapted to switch a voltage from the resistor second node 108 to the output 88. The transistor 110 includes a base input 112 electrically connected to the capacitor 102 and the diode 100, in order that the DC status signal 92 at the output 88 represents the status of the AC voltage output 94.

During a negative half cycle 114 of the AC voltage 94, current flows from the third input 46 through the zener diode 98 and the first resistor 96 to the load terminal 99. As a result, the transistor emitter-base junction is forward biased from a voltage across the series combination of the zener diode 98 and the diode 100, which voltage is across the capacitor 102. The DC signal 92 includes a current 116, which is limited by (i) the zener voltage of zener diode 98 less the diode drop of the diode 100 less the emitter-base voltage of the transistor 100, divided by (ii) the resistance of resistor 104.

For the status circuit 90, rather than using two auxiliary contacts for status, the AC voltage 94 at the load terminal 99 is used to provide a DC logic level status signal 92 via the transistor 110. The transistor 110 is turned on resulting in the control voltage 48 appearing at the status output 88. The output current of the signal 92 is short circuit limited by the resistor 104, as was discussed above, in order to protect the transistor 110.

Figure 1:
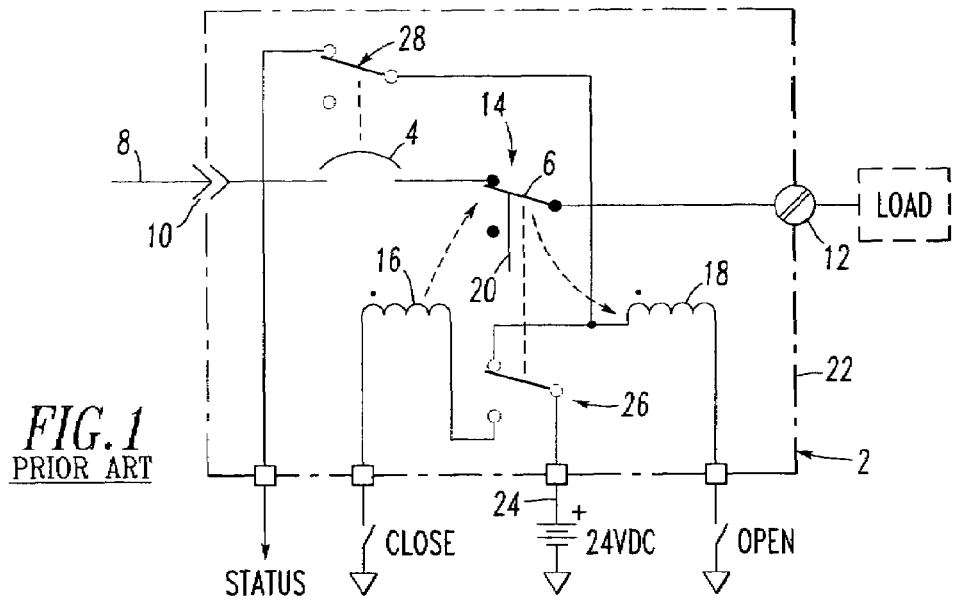
FIG. 1 is a block diagram of a controllable circuit breaker.
Figure 3:
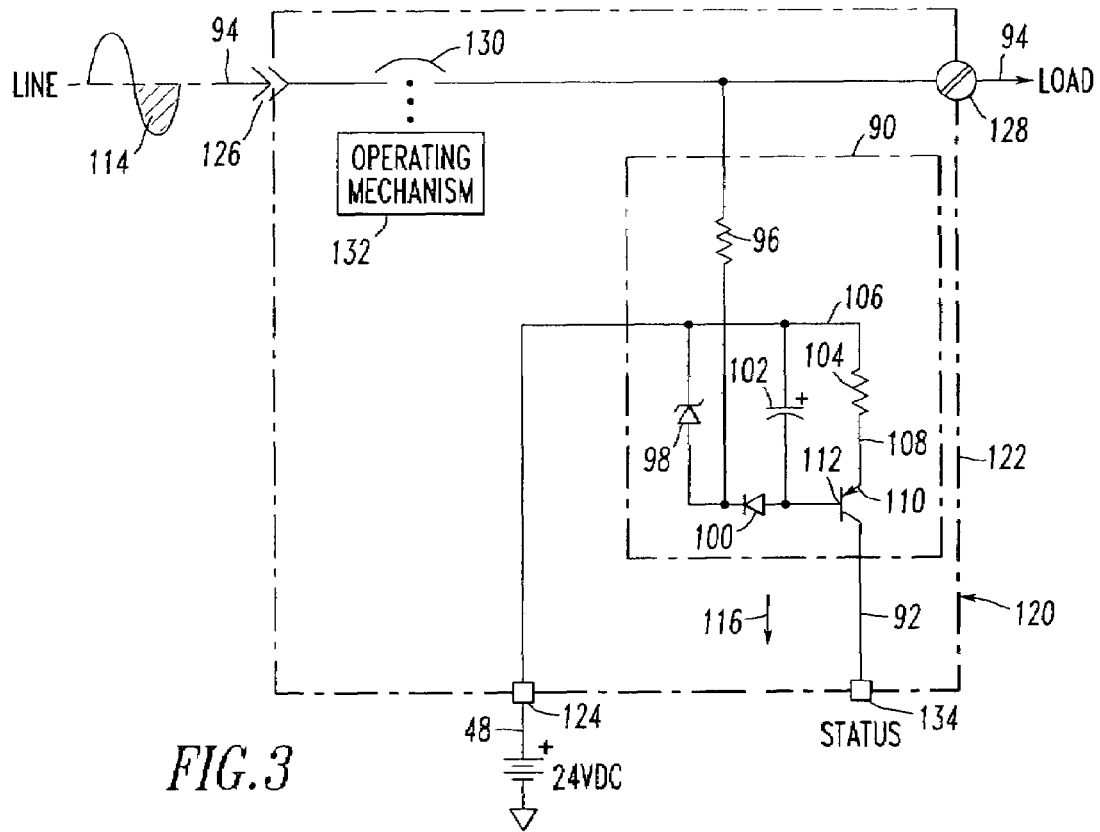
FIG. 3 is a block diagram of a circuit breaker in accordance with another embodiment of the invention.

FIG. 3 shows another circuit breaker 120 including the non-mechanical, electronic status circuit 90 of FIG. 2. The circuit breaker 120 includes a housing 122, an input 124 adapted to receive the DC control voltage 48, a line terminal 126 adapted to input the AC voltage 94, a load terminal 128, and separable contacts 130 electrically connected between the line and load terminals 126,128. A operating mechanism 132 opens and closes the separable contacts 130. In the same manner as was discussed above in connection with FIG. 2, the non-mechanical, electronic status circuit 90 is adapted to provide the DC status signal 92 at output 134 when the separable contacts 130 are closed and the load terminal 128 is energized with the AC voltage 94. The DC status signal 92 is representative of the load terminal 128 being energized with the AC voltage 94.

Although the circuits 64,66,84,90 employ analog circuitry, it will be appreciated that a combination of one or more of suitable analog, digital and/or processor-based circuits may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A controllable circuit breaker comprising:
a housing;
a first input adapted to receive an external close signal;
a second input adapted to receive an external open signal;
a third input adapted so receive a control voltage;
a set of main contacts;
an operating mechanism for opening and closing said set of main contacts;
a set of secondary contacts connected in series with said set of main contacts;
a latching solenoid including a plunger latchable to a first position which closes said set of secondary contacts and to a second position which opens said set of secondary contacts, a first coil which when energized operates said plunger to said first position and a second coil which when energized operates said plunger to said second position, said first and second coils having a common node which is electrically connected to said third input;
a non-mechanical, electronic control circuit within said housing, said non-mechanical, electronic control circuit adapted to receive the external close and open signals from said first and second inputs and responsively energize said first and second coils, respectively, from said third input for a predetermined time;
wherein said third input is adapted to receive as said control voltage a direct current control voltage; and
wherein said non-mechanical, electronic control circuit comprises, for each of said first and second coils, a first resistor, a capacitor electrically connected in series with said first resistor, a zener diode electrically connected in series with said first resistor and said capacitor, a second resistor electrically connected in parallel with the series combination of said first resistor, said capacitor and said zener diode, a third resistor electrically connected in parallel with said zenar diode, a diode electrically connected in parallel with said first resistor, and a transistor adapted to switch current from one of said first and second coils to one of said first and second inputs, respectively, said transistor having an input electrically connected to said third resistor and said zener diode, said second resistor electrically connected between said third input and a corresponding one of said first and second inputs, said transistor being adapted to energize a corresponding one of said first and second coils for said predetermined time responsive to voltage across said zener diode resulting from current flowing through the series combination of said first resistor, said capacitor and said zener diode when a corresponding one of said external close and open signals is received.

2. The controllable circuit breaker of claim 1 wherein said zener diode is a first zener diode; and wherein said non-mechanical, electronic control circuit further comprises, for each of said first and second coils, a second zener diode electrically connected in parallel with said transistor between said one of said first and second coils and said one of said first and second inputs, respectively.

3. The controllable circuit breaker of claim 1 wherein said first resistor and said capacitor substantially determine said predetermined time.

4. The controllable circuit breaker of claim 3 wherein said predetermined time is about 33 milliseconds.

5. The controllable circuit breaker of claim 1 wherein when the corresponding one of said external close and open signals is removed said capacitor discharges through said diode and said second resistor.

6. A controllable circuit breaker comprising:
a housing;
a first input adapted to receive an external close signal;
a second input adapted to receive an external open signal;
a third input adapted to receive a control voltage;
a set of main contacts;
an operating mechanism for opening and closing said set of main contacts;
a set of secondary contacts connected in series with said set of main contacts;
a latching solenoid including a plunger latchable to a first position which closes said set of secondary contacts and to a second position which opens said set of secondary contacts, a first coil which when energized operates said plunger to said first position and a second coil which when energized operates said plunger to said second position, said first and second coils having a common node which is electrically connected to said third input;
a non-mechanical, electronic control circuit within said housing, said non-mechanical, electronic control circuit adapted to receive the external close and open signals from said first and second inputs and responsively energize said first and second coils, respectively, from said third input for a predetermined time;
wherein said third input is adapted to receive as said control voltage a direct current control voltage; wherein said set of main contacts are adapted to input an alternating current voltage; wherein said set of secondary contacts are adapted to output said alternating current voltage; and wherein said non-mechanical, electronic control circuit comprises an output and a status circuit, said status circuit adapted to provide a direct current status signal at said output when said set of main contacts are closed and input said alternating current voltage, and when said set of secondary contacts are closed and output said alternating current voltage, said direct current status signal being representative of said set of secondary contacts outputting said alternating current voltage; and
wherein said set of secondary contacts output said alternating current voltage at a terminal; wherein said status circuit comprises a first resistor, a zener diode electrically connected in series with said first resistor between said third input and said terminal, a diode electrically connected to said first resistor and said zener diode, a capacitor electrically connected in parallel with the series combination of said zener diode and said diode, a second resistor including a first node electrically connected to said third input and a second node, a transistor adapted to switch a voltage from the second node of said second resistor to said output, said transistor including an input electrically connected to said capacitor and said diode, in order that said direct current status signal at said output represents said alternating current voltage at a terminal.

7. The circuit breaker of claim 6 wherein said set of secondary contacts output said alternating current voltage at a terminal; wherein said alternating current voltage includes a negative half cycle; wherein current flows from said third input through said zener diode and said first resistor to said terminal; and wherein the input of said transistor is active from a voltage across the series combination of said zener diode and said diode.

8. The circuit breaker of claim 6 wherein said zener diode has a first voltage; wherein said diode has a second voltage; wherein said transistor has a third voltage from the input thereof to the second node of said second resistor; wherein said second resistor has a resistance; and wherein said direct current status signal includes a current, which is limited by (i) said first voltage less said second and third voltages, divided by (ii) said resistance.

9. A circuit breaker comprising:
a housing;
an input adapted to receive a direct current control voltage;
a first terminal adapted to input an alternating current voltage;
a second terminal;
separable contacts electrically connected between said first and second terminals;
an operating mechanism for opening and closing said separable contacts;
an output;
a non-mechanical, electronic circuit within said housing, said non-mechanical, electronic circuit adapted to provide a direct current status signal at said output when said separable contacts are closed and said first terminal is energized with said alternating current voltage, said direct current status signal being representative of said second terminal being energized with said alternating current voltage; and wherein said non-mechanical, electronic circuit comprises a first resistor, a zener diode electrically connected in series with said first resistor between said input and said second terminal, a diode electrically connected to said first resistor and said zener diode, a capacitor electrically connected in parallel with the series combination of said zener diode and said diode, a second resistor including a first node electrically connected to said input and a second node, a transistor adapted to switch a voltage from the second node of said second resistor to said output, said transistor including an input electrically connected to said capacitor and said diode, in order that said alternating current voltage at said second terminal provides said direct current status signal at said output.

10. The circuit breaker of claim 9 wherein said alternating current voltage includes a negative half cycle; wherein current flows from said input through said zener diode and said first resistor to said second terminal; and wherein a voltage across the series combination of said zener diode and said diode activates the input of said transistor.

11. The circuit breaker of claim 9 wherein said zener diode has a first voltage; wherein said diode has a second voltage; wherein said transistor has a third voltage from the input thereof to the second node of said second resistor; wherein said second resistor has a resistance; and wherein said direct current status signal includes a current, which is limited by (i) said first voltage less said second and third voltages, divided by (ii) said resistance.

* * * * *